March 17, 1925.
M. A. MARQUETTE
TIRE BUILDING
Filed May 20, 1919
1,529,841
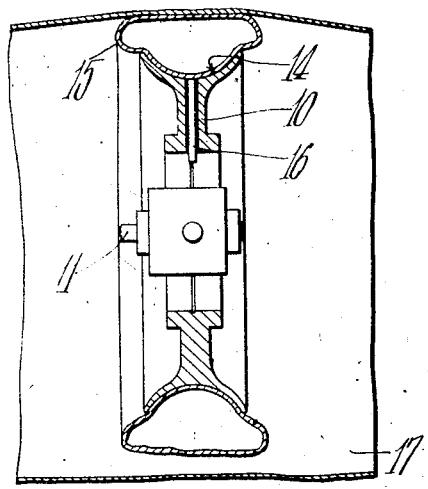
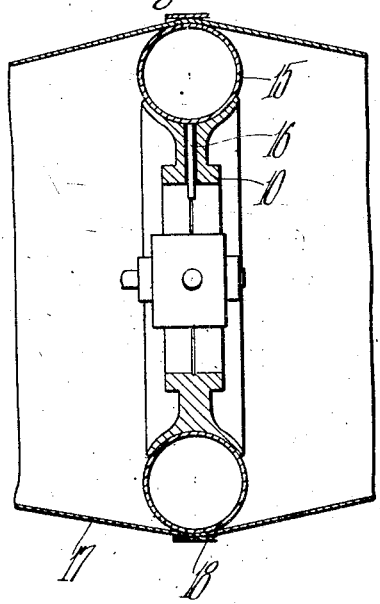
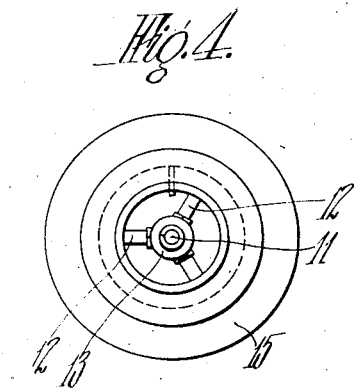
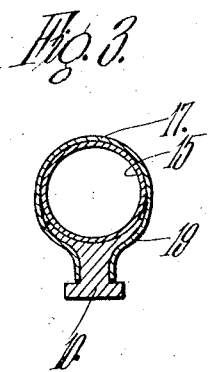
INVENTOR
Melvon A. Marquette.
BY Chapin + Neal
ATTORNEYS Patented Mar. 17, 1925.

1,529,841

UNITED STATES PATENT OFFICE.

MELVON A. MARQUETTE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TIRE BUILDING.

Application filed May 20, 1919. Serial No. 298,497.

*To all whom it may concern:*

Be it known that I, MELVON A. MARQUETTE, a citizen of the United States of America, residing at Springfield, in the county of Hampden and State of Massachusetts, have invented certain new and useful Improvements in Tire Building, of which the following is a specification.

My invention relates to a method of forming tires from bias cut fabric, either what is known as square woven fabric, thread fabric, or cord fabric, and to an apparatus by which this method may be carried out.

It has for its object to eliminate much of the labor now necessary in making these tires by hand, to increase the accuracy of position and tension with which successive layers of fabric may be superposed in building up the tire carcass, and to improve the smoothness with which the plies may be laid upon the core. It also has other objects which will appear from the description and claims.

According to the present practice in the manufacture of fabric tires, particularly those known as thread fabric tires, a plurality of plies of the fabric, previously cut on the bias, are united to form an endless band of a circumference slightly less than that of the core upon which the tire is to be built. This band is stretched manually by the tire builder over the crest of the core and is stitched down upon the sides of the core by a small roller as the core is rotated. Additional plies are placed upon the carcass so made in a similar manner. In placing additional plies upon the partially formed carcass it is necessary to separate them from the previously applied layers by means of a strip of cloth which is removed after the additional plies have been located. As it is generally preferable to give to the fabric a stretch of approximately 15%, it will readily be seen that the stretching of this fabric over the core is a matter requiring considerable effort, and it is also obvious that to get the plies smoothly in place requires much skill. A stretch of more than this amount cannot be readily given to the fabric in this method of assembly.

According to my improved method, I build up one or more plies of fabric in an endless band as before, the size of each band being sufficiently less than that which it is to assume finally in the carcass so that it will be given the desired amount of stretch. This stretch is necessary in order that the wrinkles in the fabric may be removed, the threads or cords of the fabric may be evenly tensioned, and excessive wrinkling at the sides of the tires may be avoided. I take the band of fabric so produced and place it about a core which is preferably made with a contractible or deflatable member around its circumference. When deflated, this core is slightly less in circumference than that of the band so that the band may be readily located without any excessive labor and so that the fabric will lie smoothly in place without any distortion due to its being forced over the crest of the core. The core is then inflated to a predetermined size which is preferably the internal size of the built-up carcass, and the fabric layers stitched down in place upon the sides of the core in the usual manner.

This method finds particular utility in cases where the carcass of a tire casing is to be built up out of a succession of layers of one or more plies of rubberized fabric or cord material. In this case the core is contracted to a size permitting the easy application of a band of carcass forming material around it in encircling relation, the band at this time being sufficiently smaller than the size it is to assume in the built-up carcass to provide for the stretch desired in the band upon expansion. The core with the band mounted upon it is then expanded to stretch the band to the size desired in the built-up tire carcass, and the band conformed to the sides of the core in any suitable manner. The core may then be deflated to permit the positioning around it of a second band of carcass building material, the elasticity of the band first applied allowing it to contract with the core. The second band is then expanded and is conformed to the sides of the core in any suitable manner. Succeeding bands may be similarly applied until the desired number are in place. It will be noted that by the method of my invention the bands are stretched evenly throughout their circumference, and are stretched prior to their incorporation into the carcass to the size desired in the built-up carcass and not beyond it, thereby avoiding the uneven conditions of position and tension resulting in the practice of prior methods where excessive local stretching occurred and the permanent distortion or misplacement of the strain-resisting elements that occurred when the bands were stretched before their application to a core to a size beyond what is desired in the built-up carcass. I will now describe my invention with particular reference to the accompanying drawings, in which—

Fig. 1 shows a section of a deflatable core with a band of fabric located thereon, the core being shown in its deflated condition;

Fig. 2 is a similar view showing the core inflated;

Fig. 3 is a partial section of the core showing the fabric stitched in place; and Fig. 4 is an end elevation of the core.

The core is composed of an annular member 10 mounted upon a shaft 11 or other suitable support in any one of the usual ways, as by spokes 12 radiating from a hub 13 on the shaft. The annular portion has a concave circumference 14 in which is secured an air tight tube 15 somewhat similar to the water bags now used in the vulcanization of tire casings. Leading to the tube 15 is a valve 16 preferably extending inwardly through the annular portion 10.

In the use of this core, an endless band of fabric 17 is formed and is slipped over the deflated core as shown in Fig. 1. The core is then inflated through the valve 16 until it reaches the desired size, which, as previously stated, is preferably the internal size of the built-up carcass. As a convenient way of determining when this size has been reached, a hoop 18, preferably of metal and having the desired circumference, may be placed about the core and the tube 15 expanded until it just makes contact with the hoop. The walls of the tube 15 are preferably made sufficiently rigid by the inclusion of a plurality of plies of fabric so that they will furnish sufficient resistance to enable the fabric band 17 being stitched or spun down upon the sides of the tube as shown at 19 in Figure 3. If additional plies of fabric are desired, the tube 15 may be deflated and the additional plies previously formed as an endless band slipped over the core. The tube is then inflated to the proper size and the additional plies stitched down upon the sides of the core. The beads may be inserted between the plies as they are laid in any usual or desired manner and the customary covering material, such as the tread and sidewalls, added. The manner of performing these steps will be apparent to any person skilled in the customary manufacture of tire casings, and need not be described in detail here.

I claim—

1. The method of building the carcass of a tire casing including forming one or more plies of rubberized fabric as an endless band of less size than that which it is to assume in the built-up carcass, placing said band about an expansible core while the latter is contracted, expanding the core to proper size, and stitching the fabric down upon the sides of the core.

2. The method of building the carcass of a tire casing including forming one or more plies of rubberized fabric as an endless band of less size than that which it is to assume in the built-up carcass, placing said band about an expansible core while the latter is contracted, expanding the core to the size of the interior of the built-up carcass, stitching the fabric down upon the sides of the core, forming one or more additional plies similarly as an endless band, partially contracting the core, slipping the additional plies thereover, expanding the core to the size of the interior of the built-up carcass, and stitching the additional plies down upon the sides of the core.

3. In a method of tire building, the laminating of a plurality of endless bands of tire-building material to form a toric carcass, by separately stretching the central portion of each band as it is being assembled into the carcass to but not beyond its position in the built-up carcass.

4. The method of laminating carcass plies on an expansible and contractible core in tire building, which consists in forming rubberized fabric or cord carcass-building material in several separate bands of less diameter than the core when expanded, placing a band on the core when contracted, expanding the core to stretch the band, contracting the core with the band on it, placing another band over the first band, expanding the core to stretch the second band, and repeating the operations until the desired number of bands are laminated on the core in expanded condition.

5. In a method of tire building, the laminating of a plurality of endless bands of tire building material to form a toric carcass by separately stretching each band beginning at its peripheral center line and proceeding progressively at each side of said line over the central portion of the band as it is being assembled into the carcass to but not beyond its position in the built-up carcass.

6. In a method of tire building, the laminating of a plurality of endless bands of tire building material separately upon an inflatable core which is stretchable both laterally and longitudinally, and the stretching of each band as it is placed in position in the carcass by the inflation of the core.

7. A method of making tires which includes the following steps: first, forming an endless fabric band of a diameter substantially equal to the median diameter of the tire to be made; second, placing said band on an expansible annulus; and third, expanding said annulus to shape the fabric band.

8. A method of making tires which includes the following steps: first, forming an endless fabric band of a diameter substantially equal to the median diameter of the tire to be made; second, placing said band on a fluid expansible annulus; third, inflating said annulus to stretch the central portion of the fabric band; and fourth, shaping the edges of the fabric band to the sides of the annulus.

9. A method of building a tire carcass which consists in assembling a flexible former and an endless band of carcass material in circumferentially centered relation, shaping the band to the former by uniformly acting forces simultaneously and evenly applied over the central circumferential area of the band and the former with a mutually yielding action due to the flexibility of the band and the former, both the edge portions of the band being kept free and unrestrained during the rearrangement of its central area, and then shaping the edge portions of the band to carcass form.

10. A method of building a tire carcass which consists in assembling a tire former and an endless band of carcass material in circumferentially centered relation, shaping the band to the former by uniformly acting forces simultaneously and evenly applied over the central circumferential area of the band and the former, both the edge portions of the band being kept free and unrestrained during the rearrangement of its central area, and then shaping the edge portions of the band to carcass form.

MELVON A. MARQUETTE.